Sept. 17, 1946.                G. R. GODBER                2,407,826
                CONSTRUCTION FOR ELECTRIC STORAGE BATTERIES
                         Filed March 12, 1941
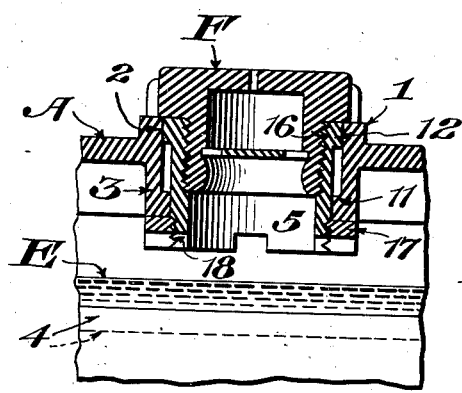
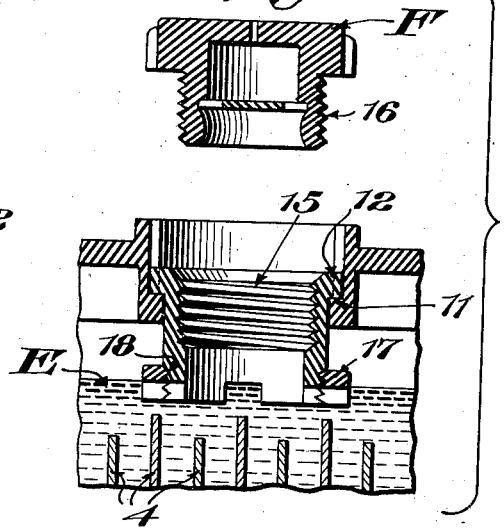
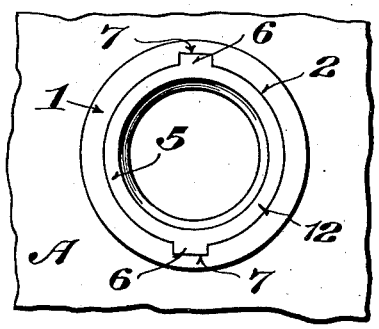
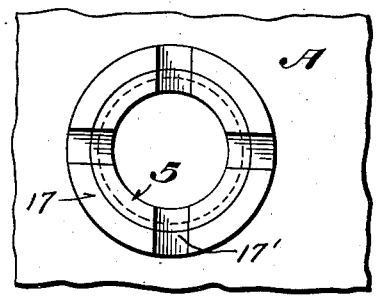
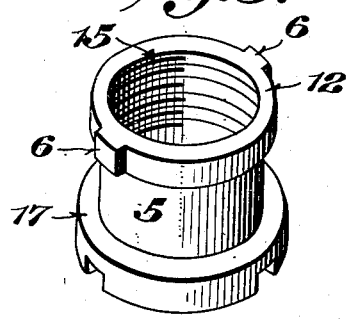
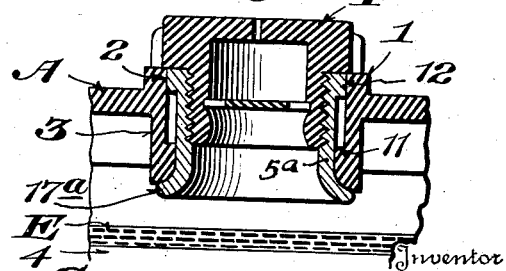
Inventor
George R. Godber;
By Wilhandten & Groff
Attorneys Patented Sept. 17, 1946

2,407,826

UNITED STATES PATENT OFFICE 2,407,826

CONSTRUCTION FOR ELECTRIC STORAGE BATTERIES

George R. Godber, Los Angeles, Calif.

Application March 12, 1941, Serial No. 383,031

3 Claims. (Cl. 136—178)

This invention relates to improvements in electric storage batteries, and has particular reference to means for determining and maintaining the proper electrolyte level in the cells of the battery, as set forth and described in my co-pending application Serial No. 288,665, filed August 5, 1939, and patented May 20, 1941, No. 2,242,671 of which this case is a continuation in part.

It is of course generally known that it is necessary for the proper functioning of electric storage batteries to maintain the level of the electrolyte at the proper point in the cells at all times. If the electrolyte level is too low and the tops of the plates are exposed, the plates quickly deteriorate and reduce the capacity of the battery while at the same time shortening its life. On the other hand too much electrolyte results in much of the surplus being lost due to gassing of the battery while on charge, splashing, and capillary action. This loss of electrolyte and its subsequent replacement with distilled water lowers the gravity of the remaining electrolyte in the cell and cuts down the power and capacity of the battery. Moreover, excess electrolyte escaping through the vent corrodes the battery carrier and terminals, and, in the case of batteries installed under the hood, the ignition cables, coils, etc., are frequently ruined by escaping acids. For these reasons it is of paramount importance that the electrolyte level be accurately controlled at all times regardless of where the battery may be installed.

Accordingly, a primary object of the invention is to provide a construction which not only maintains the electrolyte at the proper level within the cells but at the same time prevents overfilling. Briefly, the invention includes a sleeve which is interlocked with the vented filler cap in such a way that when the cap is in closed position the sleeve is elevated to vent the space between the electrolyte and the underside of the cover, while on the other hand, when the cap is removed for filling purposes, the sleeve is permitted to drop downwardly to determine the electrolyte level in the cell. When the cell is then filled, the water or electrolyte may back up into the sleeve to serve as a signal to the servicing party that sufficient liquid has been supplied. The filling of the sleeve is due to the fact that the sleeve, in its lowered position, serves to trap air in the top of the cell so that after the filling liquid has displaced sufficient air, additional liquid will back up in the sleeve, thus showing that the cell has been sufficiently supplied. When the cap is again screwed into place, the sleeve is automatically lifted, thus raising its lower edge above the established electrolyte level and permitting the small quantity of liquid remaining in the sleeve, after filling, to drain back in the cell, and venting the cell through the wide open end of the sleeve.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawing, in which:

Fig. 1 is a vertical cross-sectional view of a cell cover showing the parts forming the present invention in closed position.

Fig. 2 is a view similar to Fig. 1, but taken at right angles thereto, and showing the relation of parts when the filler cap is removed.

Fig. 3 is a top plan view of the construction shown in Figure 2, when the cap is removed.

Fig. 4 is a bottom plan view of the sleeve shown in Figs. 1 and 2.

Fig. 5 is a detailed perspective view of the filler sleeve shown in Figs. 1 and 2.

Fig. 6 is a vertical sectional view similar to Fig. 1 showing the construction of the filler sleeve when it is made from lead.

Similar reference characters designate corresponding parts throughout the several figures of the drawing.

According to the embodiment of the invention shown in the drawing, a threadless cell cover is employed, the same being designated generally as A. This cell cover carries the conventional terminal elements, not shown, and is provided with a suitable boss 1 having the filler opening 2 therein. The inner side of the cell cover A is provided with a downwardly extending collar 3 which opens into the electrolyte space of the cell. The plates and separators of the cell are designated generally as 4 and are covered with electrolyte E in the usual manner. The side wall of the collar 3 is imperforate and is therefore open only at its lower end. The said collar 3 is intended to slidably receive an adjustable filler sleeve 5, said sleeve being preferably of annular formation from hard rubber or lead and provided on its outer face with one or more lugs 6 slidably fitting in a groove or grooves 7 in the inside face of the collar so that the sleeve may move longitudinally within the collar but cannot rotate therein.

As will be apparent from Figs. 1 and 2, the upper portion of the interior of the collar 3 is of greater diameter than the lower portion, thereby to provide the lower interior end of the collar with an annular supporting shoulder 11. The sleeve 5, on the other hand, has its upper edge portion of larger diameter than its lower portion, thereby to provide an annular flange or abutment 12. Thus it will be apparent that the ultimate limit of downward travel of the sleeve 5 in the collar 3 is defined by the engagement of the shoulder 11 with the flange or abutment 12.

The upper end of the sleeve 5 is interiorly threaded as at 15 to receive the externally threaded plug portion 16 of the vented filler cap F. The lower outer surface of the sleeve 5 is intended to receive an abutment ring 17. This ring may be held to the lower portion of the sleeve 5 by threads 18 or the like engaging threads on the lower portion of the sleeve, and may or may not be provided with the notches 17' as shown.

Fig. 1 illustrates the relative position of parts when the battery is in use or when it is being charged. Fig. 2 illustrates the position of parts when the cell is to be filled. In the latter case it will be apparent that the vented filler cap F is rotated so as to unscrew the plug 16 from the threads 15 of the sleeve. The sleeve will thereby drop until the shoulder 11 and abutment 12 respectively on the collar and on the sleeve engage to provide a gas-tight seal, since, as shown in the drawing the area of engagement between 11 and 12 is mutually registering and continuous. The lower edge of the sleeve 5 which constitutes the mouth thereof defines the level of electrolyte within the cell when the sleeve is in its dropped or lowered position, as shown in Fig. 2. When the filler cap is removed and the sleeve is in its lowered position, water or electrolyte may be supplied to the cell through the sleeve and when the electrolyte level reaches the tops of the notched portions, additional liquid supplied to the cell will rise in the sleeve. When the filler cap F is replaced so that the plug 16 engages with the threads 15 and the cap is rotated in the proper direction, the sleeve 5 will be lifted until as shown, the under side of the flange of the filler cap F engages the upper edge of the abutment 12 and the ring 17 engages the bottom edge of the collar 3. Any liquid remaining in the sleeve 5 will drain back into the cell and the entire space above the electrolyte will be vented to the atmosphere through the vented filler cap F.

The sleeve 5a of Fig. 6 may be made of lead or any suitable acid-proof material, and when so made the lower edge thereof may be deformed in any suitable manner to provide the abutment, flange or the like, 17a, which fulfills the same purpose and function as the ring 17 of Figs. 1, 2 and 5.

From the foregoing it will be apparent that the construction shown and described provides for controlling the level of electrolyte in the cell by the simple act of removing and replacing the vented filler cap. When the filler cap is in the position shown in Fig. 1, the contents of the cell are properly vented through the opening in the cap and the lower end of the sleeve is withdrawn fully from the electrolyte so as to provide a large and relatively unobstructed path between the vent hole of the cap and the trapped air space between the top of the electrolyte and the underside of the cover.

Another advantage of the construction shown resides in the fact that the cover A is provided with a threadless filling opening 2. The formation of the thread on the cover is a more or less expensive operation, but this expense is avoided in the present invention because it is a comparatively simple matter to provide the sleeve 5 with the interior threads 15. In connection with these threads which receive the threaded plug portion of the vented filler cap, it will, of course, be understood that when the filler cap is rotated in a direction to be removed, the threads on the plug and the sleeve cooperate to push or force the sleeve downwardly. In other words, while the sleeve in both forms of the invention may be dropped by gravity, nevertheless the interengaging threads on the plug and sleeve insure the movement of the sleeve in the event that corrosion exists, thereby insuring a positive dropping of the sleeve to insure filling to the desired level.

Without further description, it is thought that the features and advantages of the invention will be readily apparent to those skilled in the art, and it will, of course, be understood that changes in the form, proportion and minor details of construction may be resorted to without departing from the spirit of the invention and scope of the appended claims.

I claim:

1. In an electric storage battery, a casing, plates therein, a cover having a filling opening, a depending collar surrounding said opening and having the major portion of its internal diameter of the same diameter as the opening, an internal shoulder formed integrally with and near the lower end of the collar, a vertically movable sleeve for filling the battery with liquid and also providing an internal gas venting passage of wide area, said sleeve having an external annular abutment near its top whose outer edge has a close sliding fit with the internal diameter of the collar, whereby, when the sleeve is moved downwardly said abutment rests flush on said shoulder to provide a gas tight seal and also to determine the downward limit of travel of the sleeve and sustain the bottom edge thereof a predetermined distance above the upper edges of said plates, an abutment at the lower end of said sleeve extending outwardly therefrom to engage the lower end of said collar and determine the upward limit of movement of said sleeve in the collar, means for preventing rotation of the sleeve in the collar, and a closure cap having a vented head whose bottom outer edge is adapted to engage with the top of the filling opening, said cap also provided with a hollow shank communicating with the sleeve and having a threaded connection with the inner wall of said sleeve, whereby, rotation of said cap in one direction to close the filling opening raises the sleeve to its limit of upward movement to lift its lower end out of the liquid and thus permit all of the space between the liquid and the underside of the cover to communicate directly through the sleeve with the vented head of the filler cap, and the cap upon rotation in the opposite direction and removal from the sleeve releases the sleeve for downward movement to rest on the shoulder of the collar to permit liquid to be supplied therethrough to the casing.

2. In an electric storage battery, a casing, plates therein, a cover having a filling opening, a depending collar surrounding said opening, an internal shoulder formed integrally with and near the lower end of the collar, a vertically movable sleeve fitting in said collar, and having an external annular abutment near its top whereby when the sleeve is moved downwardly said abutment rests on said shoulder to determine the downward limit of travel of the sleeve and sustains the bottom edge thereof a predetermined distance above the upper edges of said plates, an abutment ring having a threaded engagement with the lower end of the sleeve and extending outwardly from the periphery thereof to engage with the lower end of said collar to determine the upward limit of movement of said sleeve, means for preventing rotation of the sleeve in the collar, and a vented closure cap having threaded connection with said sleeve and engaging with said cover outwardly of said filling opening, whereby upon rotation of said cap in one direction to close the filling opening it raises the sleeve to its limit of upward movement to lift its lower end out of the electrolyte and permits all of the space between the electrolyte and underside of the cover to communicate with the vented cap, and upon rotation in the opposite direction and removal from the sleeve it releases the sleeve for downward movement to rest on the shoulder of the collar to permit liquid to be supplied therethrough to the casing.

3. In an electric storage battery, a casing, plates therein, a cover having a filling opening, a depending collar surrounding said opening and having the major portion of its internal diameter of the same diameter as the opening, an internal shoulder formed integrally with and near the lower end of the collar and having a flat upper face, a vertically movable sleeve for filling the battery with liquid and also providing an internal gas venting passage of wide area, said sleeve having an external annular abutment at its top whose outer edge has a close sliding fit with the internal diameter of the collar, whereby, when the sleeve is moved downwardly the lower face of said abutment rests flush on the flat upper face of said shoulder to provide a gas tight seal, the lower end of said sleeve being flared downwardly and outwardly in bell-like formation and terminating in a flange lying wholly outside of the inner diameter of the sleeve for engaging with the lower end of said collar to determine the upward limit of movement of said sleeve in the collar, means for preventing rotation of the sleeve in the collar, and a closure cap having a head provided with a central vent and whose bottom outer edge is adapted to engage with the top of the filling opening, said cap also provided with a hollow shank whose inner bore communicates with the vent and sleeve and which shank has a threaded connection with the inner wall of said sleeve, whereby, rotation of said cap in one direction on the upper edge of the filling opening to close the said filling opening raises the sleeve until the upper face of the said external annular abutment engages the under side of said vented head to seal the upper end of said sleeve and also bring the flange of the sleeve into engagement with the shoulder at the lower end of the collar to limit upward movement of the sleeve and lift its lower end out of the liquid and permit all of the space between the liquid and the underside of the cover to communicate directly with the vented head through the sleeve and hollow shank of the filler cap, and the cap upon rotation in the opposite direction and removal from the sleeve releases the sleeve for downward movement to rest on the shoulder of the collar to permit liquid to be supplied therethrough to the casing.

GEORGE R. GODBER.